US009398300B2

(12) United States Patent
Siddaramanna et al.

(10) Patent No.: US 9,398,300 B2
(45) Date of Patent: Jul. 19, 2016

(54) METHOD, SYSTEM AND APPARATUS FOR INTRA-PREDICTION IN VIDEO SIGNAL PROCESSING USING COMBINABLE BLOCKS

(71) Applicant: Texas Instruments Incorporated, Dallas, TX (US)

(72) Inventors: Mahant Siddaramanna, Bangalore (IN); Naveen Srinivasamurthy, Bangalore (IN); Soyeb Nagori, Bangalore (IN)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 655 days.

(21) Appl. No.: 13/645,652

(22) Filed: Oct. 5, 2012

(65) Prior Publication Data

US 2013/0089143 A1 Apr. 11, 2013

(30) Foreign Application Priority Data

Oct. 7, 2011 (IN) .......................... 3466/CHE/2011

(51) Int. Cl.
*H04N 7/32* (2006.01)
*H04N 19/14* (2014.01)
*H04N 19/159* (2014.01)
*H04N 19/176* (2014.01)
*H04N 19/119* (2014.01)
*H04N 19/593* (2014.01)

(52) U.S. Cl.
CPC ............. *H04N 19/14* (2014.11); *H04N 19/119* (2014.11); *H04N 19/159* (2014.11); *H04N 19/176* (2014.11); *H04N 19/593* (2014.11)

(58) Field of Classification Search
CPC ... H04N 19/14; H04N 19/119; H04N 19/159; H04N 19/176; H04N 19/593
See application file for complete search history.

(56) References Cited

U.S. PATENT DOCUMENTS

| | | | | |
|---|---|---|---|---|
| 6,289,173 | B1* | 9/2001 | Miyashita et al. | 386/328 |
| 8,374,246 | B2* | 2/2013 | Raveendran et al. | 375/240.16 |
| 2002/0118399 | A1* | 8/2002 | Estevez et al. | 358/426.07 |
| 2002/0131492 | A1* | 9/2002 | Yokoyama | 375/240.03 |
| 2002/0141503 | A1* | 10/2002 | Kobayashi et al. | 375/240.27 |
| 2003/0072374 | A1* | 4/2003 | Sohm | 375/240.16 |
| 2003/0088825 | A1* | 5/2003 | Chakraborty | 715/500 |
| 2004/0096111 | A1* | 5/2004 | Thyagarajan | 382/239 |
| 2004/0264574 | A1* | 12/2004 | Lainema | 375/240.16 |
| 2005/0254717 | A1* | 11/2005 | Kalevo et al. | 382/238 |
| 2006/0062301 | A1* | 3/2006 | Sung | 375/240.13 |
| 2006/0165163 | A1* | 7/2006 | Burazerovic et al. | 375/240.03 |

(Continued)

*Primary Examiner* — Jay Patel
*Assistant Examiner* — Joseph Suh
(74) *Attorney, Agent, or Firm* — Gregory J. Albin; Frank D. Cimino (57) ABSTRACT

A method, apparatus and system for a video encoder for selecting a block of intermediate size from a set of block sizes for intra-prediction estimation for encoding a video signal. A set of neighboring blocks with the intermediate size are tested for combining. If the set of neighboring blocks are determined to be combinable, the video encoder selects a larger block size formed by the tested neighboring blocks for encoding. On the other hand, if the set of neighboring blocks are determined to be not combinable, the video encoder selects a smaller block size from the set of tested neighboring blocks for prediction. Furthermore, intra-prediction is determined by first intra-predicting a block with intermediate modes in a set of modes. Then the intra-predictions are performed for the neighboring modes of at least one intermediate mode.

18 Claims, 6 Drawing Sheets

(56) References Cited

U.S. PATENT DOCUMENTS

| | | | |
|---|---|---|---|
| 2006/0262853 A1* | 11/2006 | Li et al. | 375/240.16 |
| 2007/0086527 A1* | 4/2007 | Yan | 375/240.24 |
| 2008/0170613 A1* | 7/2008 | Tian et al. | 375/240.03 |
| 2012/0236936 A1* | 9/2012 | Segall et al. | 375/240.08 |

\* cited by examiner

METHOD, SYSTEM AND APPARATUS FOR INTRA-PREDICTION IN VIDEO SIGNAL PROCESSING USING COMBINABLE BLOCKS

CROSS REFERENCES TO RELATED APPLICATIONS

This application claims priority from Indian patent application No. 3466/CHE/2011 filed on Oct. 7, 2011, which is hereby incorporated by reference in its entirety.

TECHNICAL FIELD

The present disclosure relates generally to video signal processing and, more specifically, to a method, system and apparatus for intra-prediction in video signal processing.

RELATED ART

Video signal processing generally includes encoding and/or decoding of a video signal comprising a sequence of images or frames. One reason for encoding video signals is to achieve compression or reduce number of bits representing each frame to enable the video signal to be efficiently transmitted, broadcasted, stored and/or managed in various applications. The encoded video signal is decoded or reconstructed by employing corresponding decoding techniques, as is well known in the art.

In general, each frame of the video signal is segmented/split into blocks of suitable size for processing. Each block is compared with a reference block to generate a residual block having a lower energy level. The residual block is then encoded using techniques such as, but not limited to, entropy coding that requires fewer bit to represent the residual block.

The reference block is often predicted or estimated using one or more prediction techniques such as inter-prediction/motion estimation and intra-prediction. In an intra-prediction technique, the reference block is predicted by interpolating neighbouring pixels. Prediction is often performed in a number of directions that are referred to as modes, as is well known in the art. The best predicted block is used as reference block.

Various video coding standards such as, but not limited to, H.264/AVC (Advanced Video Coding), and High Efficiency Video Coding (HEVC), specify the set of directions and block sizes for encoding. Often, the prediction is performed for all the specified modes and block sizes to select the best reference block for generating the residual block.

SUMMARY

According to an aspect of the present disclosure, a video encoder selects a block of intermediate size from a set of block sizes for intra-prediction estimation for encoding a video signal. A set of neighbouring blocks of the intermediate size are tested to determine whether they may be combined. If the set of neighbouring blocks are determined to be combinable, the video encoder selects a larger block size formed by the tested neighbouring blocks for encoding.

According to another aspect, the video encoder uses the mode class and the activity of the block as parameters to determine whether blocks may be combined. In one embodiment, the video encoder first selects HEVC treeblocks of intermediate size and moves up in the tree block size if the selected tree blocks are determined to be combinable and moves down in the tree block size if the selected tree blocks are determined to be not combinable.

According to another aspect of the present disclosure, the best mode for intra-prediction is determined by first intra-predicting a block with a first subset of modes dispersed in the set of modes specified for intra-predicting a block for encoding a video signal. Then, one or more modes from the first subset of modes are selected, in which the block predicted with the selected mode(s) has a cost that is lower than the block predicted with other modes in the first subset. Then, an intra-prediction for a set of neighbouring modes may be performed within a desired angle from the mode(s). In one embodiment, the video encoder selects a best mode from the first subset of modes and set of neighbouring modes by as best mode comparing the cost of the blocks predicted using first subset of modes and the set of neighbouring modes.

DETAILED DESCRIPTION OF THE PREFERRED EXAMPLES

Figure 1:
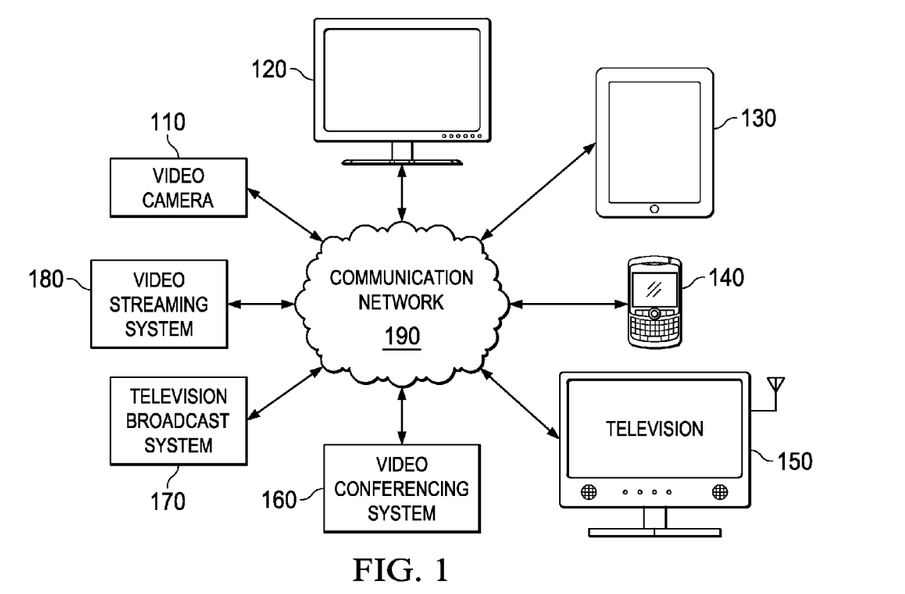
FIG. 1 is an example environment in which various aspect of the present disclosure may be implemented.

FIG. 1 is an example environment in which various aspect of the present disclosure may be implemented. As shown, the environment may comprise, for example, one or more video cameras 110, computers 120, personal digital assistants (PDA) 130, mobile devices 140, televisions 150, video conference systems 160, video streaming systems 180, TV broadcasting systems 170 and communication networks/channels 190.

The video cameras 110 may be configured to take continuous pictures and may generate digital video a signal comprising sequence of image frames. The video cameras 110 may be configured to process the image frames for efficient storage and/or for transmission over the communication network 190. The computers 120, PDAs 130 and the mobile devices 140 may be configured to encode the video signals for transmission and to decode encoded video signals received from the communication networks/channels 190. The video streaming system 180 may be configured to encode video signal and to transmit the encoded video signals over the communication networks/channels 190 responsive to a received request and/or asynchronously. The television broadcast systems 170 may be configured to process video signals in accordance with one or more broadcast technologies and to broadcast the processed video signals over the communication networks/channels 190. The video conference systems 160 may be configured to receive a video signal from one or more participating/conferencing end-terminals (not shown) and to convert or compress the video signal for broadcasting or for transmitting to other participating user terminals. The televisions 150 may be configured to receive encoded video signals from one or more different broadcasting centres (or channels), to decode each video signal and to display the decoded video signals on a display device (not shown).

As shown in FIG. 1, the devices and systems 110-180 may be coupled to communication networks/channels 190. Communication networks/channels 190 may support an exchange of video signal encoded in accordance with one or more video encoding standards such as, but not limited to, H.263, H.264/AVC, and HEVC (H.265), for example. Accordingly, the devices and systems 110-180 may process (encode and/or decode) video signals complying with such standards. The systems and devices 110-180 may be implemented with one or more functional units that may be configured to perform signal processing, transmitting and/or receiving of video signals from communication networks/channels 190. An example implementation is described below in further detail.

Figure 2:
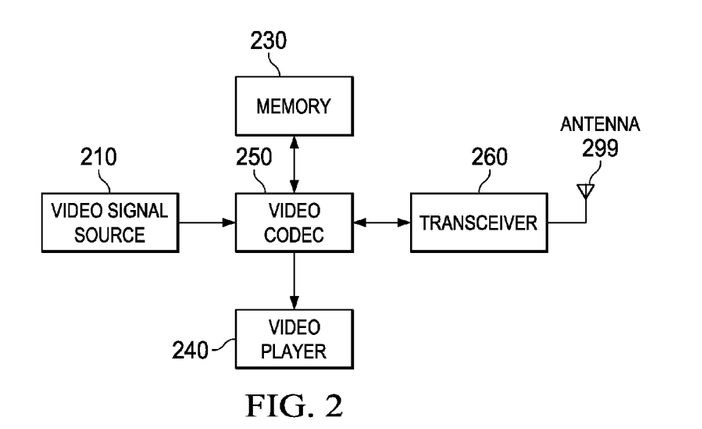
FIG. 2 is a block diagram illustrating exemplary functional units that may be operative within one or more of the exemplary devices/systems shown in FIG. 1.

FIG. 2 is a block diagram illustrating exemplary functional units that may be operative within one or more of the exemplary devices/systems shown in FIG. 1. The block diagram is shown containing video signal source 210, memory 230, video player 240, video codec (video encoder and decoder) 250 and transceiver 260. Each functional unit shown in FIG. 2 is described in further detail below.

The video signal source 210 may be configured to provide a sequence of video frames in digitized form to the video codec 250 for encoding. The sequence of video frames may be provided as luminance (luma) samples, together with two corresponding chrominance (chroma) samples for a picture frame. The video signal source 210 may also be configured to provide samples of a monochrome picture coded using three separate color planes, as is well known in the art. The video signal source 210 may also be configured to provide video signals configured according to various video picture frame formats. The video frames provided by the video signal source 210 may also be provided in any other representation or formats suitable for encoding.

The memory 230 may be configured to store video signals for encoding or for subsequent playback. The memory 230 may receive the video signals from the video codec 250 or from other sources of video signals. The memory 230 may also be configured to store encoded video signals for transmission, and may be configured to store temporary or intermediate data during the processing of video frames.

The video player 240 may be configured to play decoded video from the video codec 250 and/or video stored in the memory 230. The video may be played on a display coupled to the device and/or other displays.

The transceiver 260 may be configured to transmit encoded signals over the communication networks/channels and to receive encoded video signals from communication networks/channels 190. The transceiver 260 may be further configured to modulate video signals for transmission and to demodulate video signals received from the communication networks/channels. The transceiver 260 may be further configured to adapt modulation and demodulation techniques in compliance with one or more communication standards.

The video codec 250 may be configured to encode video signals received from the memory 230 and/or from the video signal source 210 and to decode the encoded video signals received from the transceiver 260. The video codec 250 may be implemented on a digital signal processor (DSP) configured to execute program instructions or may be implemented as a dedicated integrated circuit (IC) configured to encode and decode video signals. The video codec 250 may be configured or implemented to encode and decode video signals in compliance with one or more communication standards. An example implementation of video codec 250 for encoding a video signal is described in further detail below. The decoding of encoded video signals may be implemented as the inverse of the encoding and is not described here for conciseness. Persons of ordinarily skill in the art may implement video codec 250 for decoding by reading the present disclosure.

Figure 3:
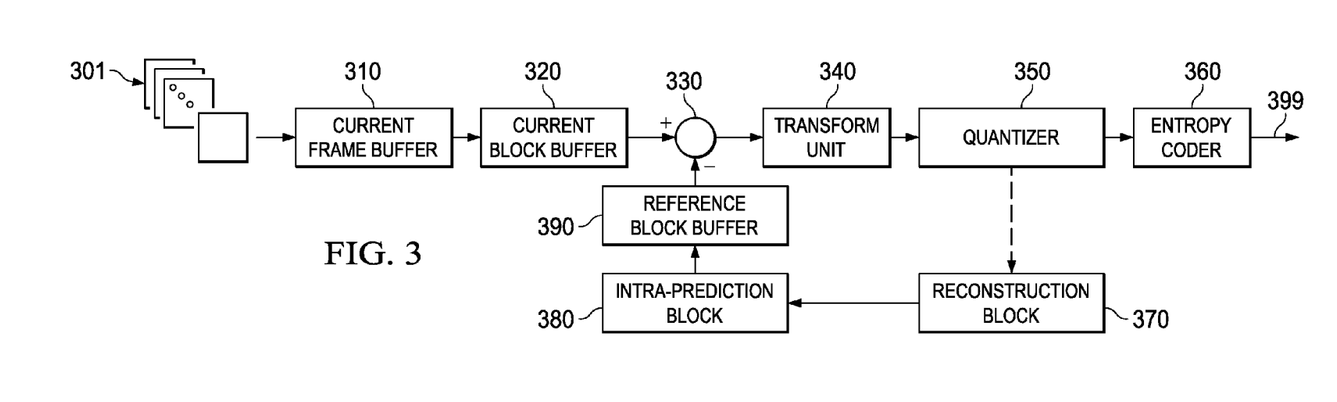
FIG. 3 is a block diagram of an exemplary video codec of FIG. 2.

FIG. 3 is a block diagram of an exemplary video codec 250 of FIG. 2. The video codec 250 may comprise a number of functional units, including current frame buffer 310, current block buffer 320, subtractor 330, transform unit 340, quantizer 350, entropy encoder 360, reconstruction block 370, intra-prediction block 380 and reference block buffer 390. Each of these functional units is described in further detail below.

The current frame buffer 310 may be configured to hold an image frame for encoding for a predetermined time. A sequence of frames, shown in FIG. 1 at reference 301, may be loaded/sent one-by-one to the current frame buffer 310. The current frame buffer 310 thus, may be configured to hold a frame for a predetermined time period for further processing. Once the frame in the current frame buffer 310 is processed, a next frame in the sequence may be sent to the current frame buffer 310 for encoding.

The current block buffer 320 may be configured to hold a particular block within the frame being encoded. The size, dimension of the block may be determined or selected based on one or more standards being complied with for encoding. The reference block buffer 390 may be configured to hold a reference block received from the intra-prediction block 380 for generating a residual block.

The subtractor 330 may be configured to subtract a reference block in the reference block buffer 390 from the current block in the current block buffer 320. The Subtraction may be performed on the constituent pixel value of the current and reference blocks to generate a difference or residual block. The difference or residual block resulting from the subtraction at 330 may be provided to the transform unit 340. The transform unit 340 may be configured to receive the residual block from the subtractor 330 and to apply transform coding techniques there on such as, but not limited to, block transform coding to represent the pixels for better coding or compression. In general, the transform unit 340 may make use of correlation between pixels to represent the block with reduced redundancy.

The quantizer 350 may be configured to quantize the transformed block with a set of quantization level. The entropy coder 360 may be configured to encode the quantized pixels with a predetermined entropy coding technique. The thus entropy-coded block may be transmitted over communication networks/channels 190 on path 399.

The reconstruction block 370 may receive the quantized block from quantizer 350 and reconstruct the block by performing the inverse operation of the quantizer 350 and transform unit 340. The reconstructed block may be provided to the intra-prediction block 380 for predicting a reference block.

Intra-prediction block 380 may be configured to predict a reference block by applying one or more prediction techniques complying with one or more standards. The intra-prediction block 380 may perform an intra-prediction estimation (IPE), in which a number of prediction blocks may be generated by performing prediction for different block sizes and/or for different modes that are supported in the applicable standard. From the number of prediction blocks thus generated, a best prediction block, which may reduce the total bits required to encode a current block in the buffer 320, may be used as a reference block. The reference block may then be sent to/loaded to reference block buffer 390 for subtraction from the current block. The intra-prediction block 380 may use the reconstructed frame or any other reference frame for performing prediction in compliance with the applicable standard. The manner in which intra-prediction block 380 may determine the block size and modes for prediction is described with reference to an example HEVC standard that supports multiple block sizes and modes for encoding. Accordingly, the block sizes and modes in the HEVC standard are briefly described below for completeness.

According to HEVC standard, each picture frame may be divided into tree-blocks of up to 64×64 luma samples. The tree-blocks may be recursively split into smaller Coding Units (CUs) using a generic quad-tree segmentation structure. The CUs may be further split into Prediction Units (PUs) for use in inter and intra-prediction.

Figure 4:
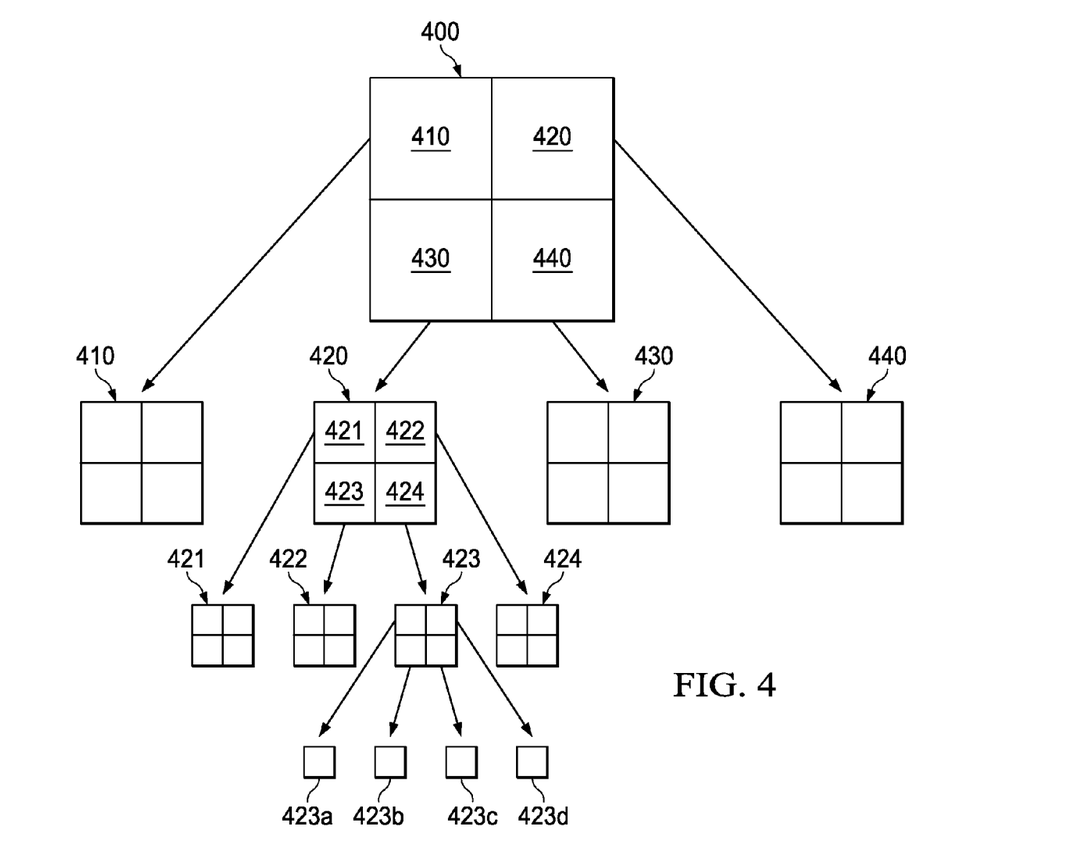
FIG. 4 illustrates exemplary blocks according to the HEVC standard.

FIG. 4 illustrates exemplary blocks configured according to the HEVC standard. As shown in FIG. 4, the quad-tree structure may comprise a largest coding unit/block (LCU) 400 of size 64×64. The LCU 400 is shown divided into four coding units 410, 420, 430 and 440, each of the size 32×32. Each coding unit 410-440 may be further divided into four 16×16 tree-blocks 421, 422, 423 and 424. Each tree-block 421, 422, 423 and 424 may be further divided into four tree-blocks of size 8×8 (shown with example blocks 423a-423d for tree-block 423). Each 8×8 tree-block may be further divided into four 4×4 prediction blocks for inter/intra prediction (not shown). Thus, the intra-prediction block 380 may select block size for prediction from the block sizes shown in FIG. 4.

Figure 5:
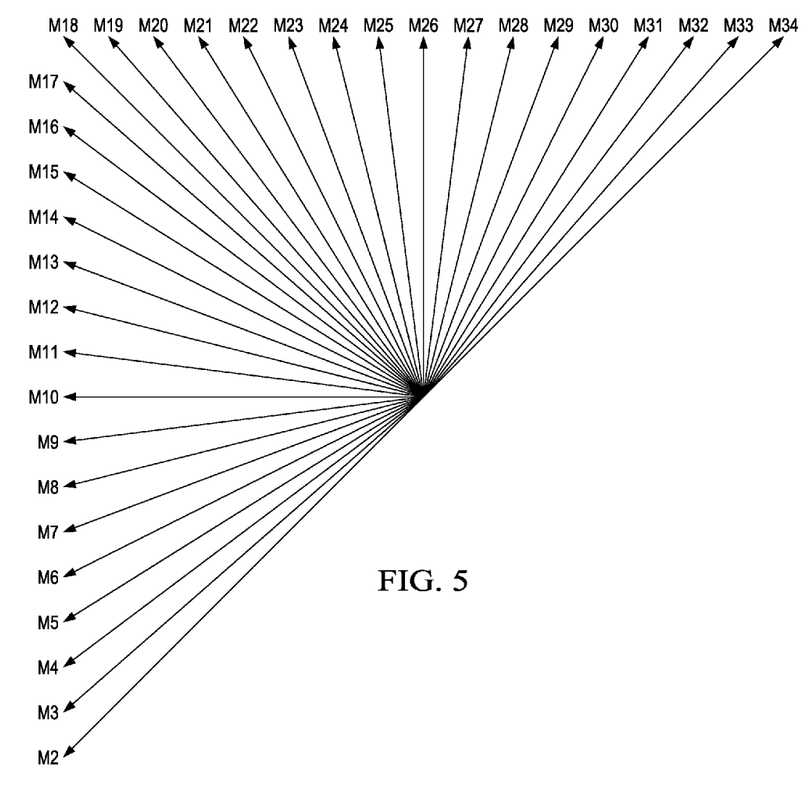
FIG. 5 depicts the number of directions in which a selected block (of a particular block size) in FIG. 4 may be predicted in accordance with the HEVC standard.

Similarly, FIG. 5 depict the number of directions in which a selected block (of a particular block size selected from the block sizes shown in FIG. 4) may be predicted in accordance with the HEVC standard. As shown, M2-M34 represents the 33 directions/angles of prediction in the HEVC standard. The DC prediction mode (mode 1) and the planar prediction mode (mode 0) are not shown in FIG. 5. Thus, a total of 35 prediction modes are supported in the HEVC standard.

In one prior technique, a reference block is determined by performing prediction for all the blocks of all the sizes (for example, considering all blocks from smallest block size to largest block size) supported in the HEVC standard and, for each block, by making predictions for all the modes/direction. Thus, a total of 35 predictions are performed for each block in the Quad-tree of FIG. 4. For example, considering the 5 block sizes (64×64, 32×32, 16×16, 8×8 and 4×4) in the Quad-tree, and 35 modes of FIG. 5 for each size, a total of 175 (35*5) predictions are made resulting in 520, 192 (175× number of pixels in LCU) number of pixel operations (additions/subtractions/absolute) for each LCU (64×64 pixel). Thus, such techniques require the video codec to perform a great many computations, which may cause delay in encoding video signals and which also may necessitate the use of a large amount of processing resources, time and/or power.

The manner in which video codec 250 may be implemented to encode a video signal while reducing the required of computation, reducing the delay and/or decreasing the amount of processor time and/or power according to one embodiment is described in further detail below.

Figure 6:
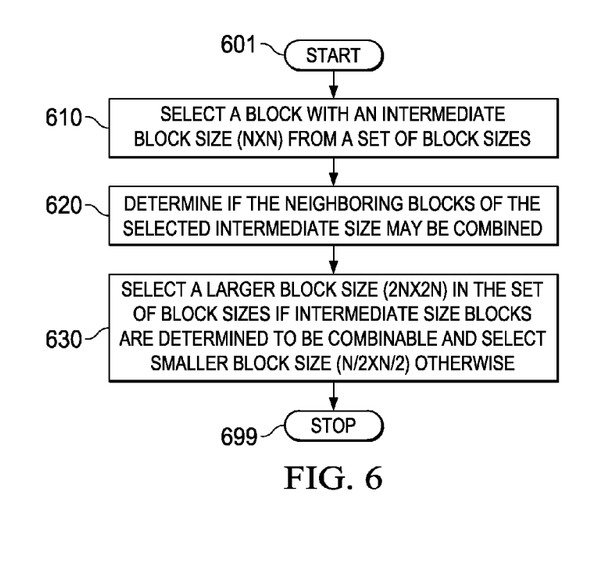
FIG. 6 is a flowchart illustrating the manner in which blocks may be selected from a set of block sizes for performing IPE in one embodiment.

FIG. 6 is a flowchart illustrating the manner in which blocks may be selected from a set of block sizes for performing IPE, according to one embodiment. The flowchart begins at block 601 whereupon control passes to Block 610.

In Block 610, the intra-prediction block 380 selects a block with an intermediate block size (N×N) from a set of block sizes. For example, in case of an HEVC standard, the prediction block may select a 16×16 image block size from the quad-tree structure of FIG. 4 for the IPE in the first iteration to determine the reference block.

In Block 620, the prediction block 380 determines if the neighbouring blocks of the selected intermediate size may be combined. One or more parameters may be used to determine whether the neighbouring blocks of the intermediate size may be combined. For example, the prediction block may determine that four intermediate blocks are combinable if the intermediate blocks are determined to be smooth. For example, the neighbouring blocks may be selected such that they form a square block when combined.

In Block 630, the intra-prediction block 380 may select a larger block size (2N×2N) in the set of block sizes if neighbouring blocks of intermediate size are determined to be combinable and may select a smaller block size (N/2×N/2) otherwise. For example, if four 16×16 blocks are determined to be combinable based on the selected parameter(s), the prediction block 380 may select a block of 32×32 (the next bigger block size in the set) formed by the four 16×16 blocks (neighbouring block). On the other hand, the intra-prediction block 380 may select a block of size 8×8 within the intermediate block 16×16. Thus, IPE may be performed by moving up or down in the block size, thereby avoiding IPE for either larger block sizes or smaller block sizes in the set of block sizes. As a result, the intra-prediction block 380 may not perform predictions for some block sizes, thereby reducing one or more of the number of computations, the processing time and/or the required power, for example. The flow chart ends at Block 699.

Figure 7:
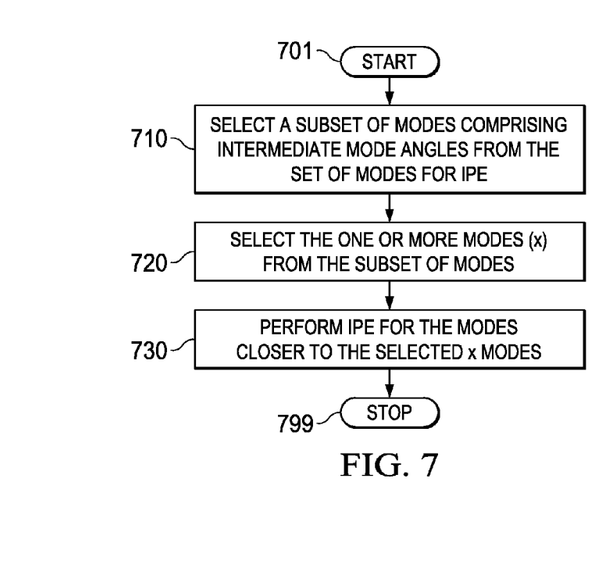
FIG. 7 is a flowchart illustrating the manner in which modes may be selected from a set of modes for performing IPE in one embodiment.

FIG. 7 is a flowchart illustrating the manner in which modes may be selected from a set of modes for performing IPE in one embodiment. The flowchart begins at Block 701, whereupon control passes to Block 710.

In Block 710, the intra-prediction block 380 selects a subset of modes comprising intermediate mode angles from the set of modes for IPE. For example, in case of an HEVC standard, from FIG. 5, the prediction block may select modes M2, M6, M10, M14, M18, M22, M26, M30, and M34 (uniformly dispersed across all prediction angles) for the IPE in the first iteration for a selected block size. Alternatively, the intra-prediction block 380 may select modes that are at 22.5 degrees and/or 45 degrees from each other.

In Block 720, the intra-prediction block 380 selects one or more modes from the subset of modes of Block 710. For example, the intra-prediction block may select a best x number of modes from the subset such that x is less than the total number of modes in the subset. For example, a residual block may be generated for each mode predicted block and the energy in the residual block (referred to as cost) may be used to determine the best x modes.

In one alternative embodiment, the subset of modes in Block 710 and best x modes in Block 720 may comprise modes from a pre-analysis, most probable mode, and/or winner modes from lower block sizes and mode received through other means.

In Block 730, the intra-prediction block 380 may perform IPE for the modes close to the selected x modes in Block 720. For example if modes M18 and M34 are selected as the best modes based on the cost in Block 720, then modes M16, M17, M19 and M20 corresponding to the selected M18 mode and modes M32 and M33 corresponding to the selected M34 mode may be considered for performing IPE.

The predicted block that best matches the current block in buffer 320 (low cost/a lowest residual energy) may be used as reference block for encoding. As a result, the intra-prediction block 380 may not perform IPE computations for at least some of the modes, thereby reducing the number of computations, processing time and/or processor power, for example. The flow chart ends at Block 799

Exemplary parameters that may be used in deciding whether to select a larger block size or a smaller block size for prediction from one or more predicted blocks of intermediate size are described in further detail below.

In one embodiment, the modes of the intermediate blocks (N×N) may be used as one of the parameters for determining whether the blocks may be combined. The mode for each intermediate block may be determined by performing IPE for each block in number of modes. The mode that results in a predicted block that is closest to the current block in the current block buffer 320 may be considered as the mode of the corresponding intermediate block. Similarly, the modes for the other adjacent/neighbouring blocks of intermediate size also may be determined. If the maximum mode angle between any two or more neighbouring blocks is less than a threshold, the intra-prediction block 380 may determine that the neighbouring blocks are of same mode class and may decide to combine the two or more neighbouring blocks. For example, with respect to the HEVC standard and with reference to FIGS. 4 and 5, if the modes of the four 16×16 blocks are determined to be M7, M8, M10, and M11, and the threshold angle is set to 22.5 degrees, the intra-prediction block 380 may determine that all of the four neighbouring 16×16 blocks as combinable. Thus, the intra-prediction block 380 may select a larger 32×32 block formed by the four neighbouring 16×16 blocks for next iteration, ignoring the 8×8 and 4×4 blocks contained within the each 16×16 neighbouring block.

As an example, the intra-prediction block 380 may consider the smoothness of the intermediate blocks as another parameter for combining the blocks. In one embodiment, the smoothness may be determined by measuring the activity of the intermediate block. The measure of activity may be obtained from the gradient of the intermediate block. The gradient of a block with a width H and height V pixels may be determined from the following relations:

$$actX(n) = \sum_{y=0}^{V-1} \sum_{x=0}^{H-2} |curr_{(n)}(x, y) - curr_{(n)}(x+1, y)| \qquad (1)$$

In which, actX(n) is a horizontal gradient, $curr_{(n)}(x, y)$, and $curr_{(n)}(x+1, y)$ are the pixel values at coordinate (x, y) and (x+1, y) respectively for block n $$actY(n) = \sum_{x=0}^{H-1} \sum_{y=0}^{V-2} |curr_{(n)}(x, y) - curr_{(n)}(x, y+1)| \qquad (2)$$

In which, actY(n) is a vertical gradient. The average block activity act(n) may be obtained from the relation $$act(n)=(actX(n)+actY(n))/f(V, H) \qquad (3)$$

in one embodiment, f(V,H)=(V*H), in which "*" represent the multiplication operation. According to one embodiment, the intra-prediction block 380 may be configured to combine the neighbouring blocks of intermediate size (select larger block) if the average activity is less than a threshold value.

The mode class and activity parameters described above are examples of parameters that may be used for combining the neighbouring blocks. However, the intra-prediction block 380 may be configured to use other parameters such as, but not limited to, pixel variance, energy in frequency components (from a frequency analysis results) and energy in sub-bands (from a wavelet analysis results), for example.

The manner in which the intra-prediction block 380 may use both the mode class and the activity parameters for selecting the block size in one embodiment is described in further detail below.

Figure 8:
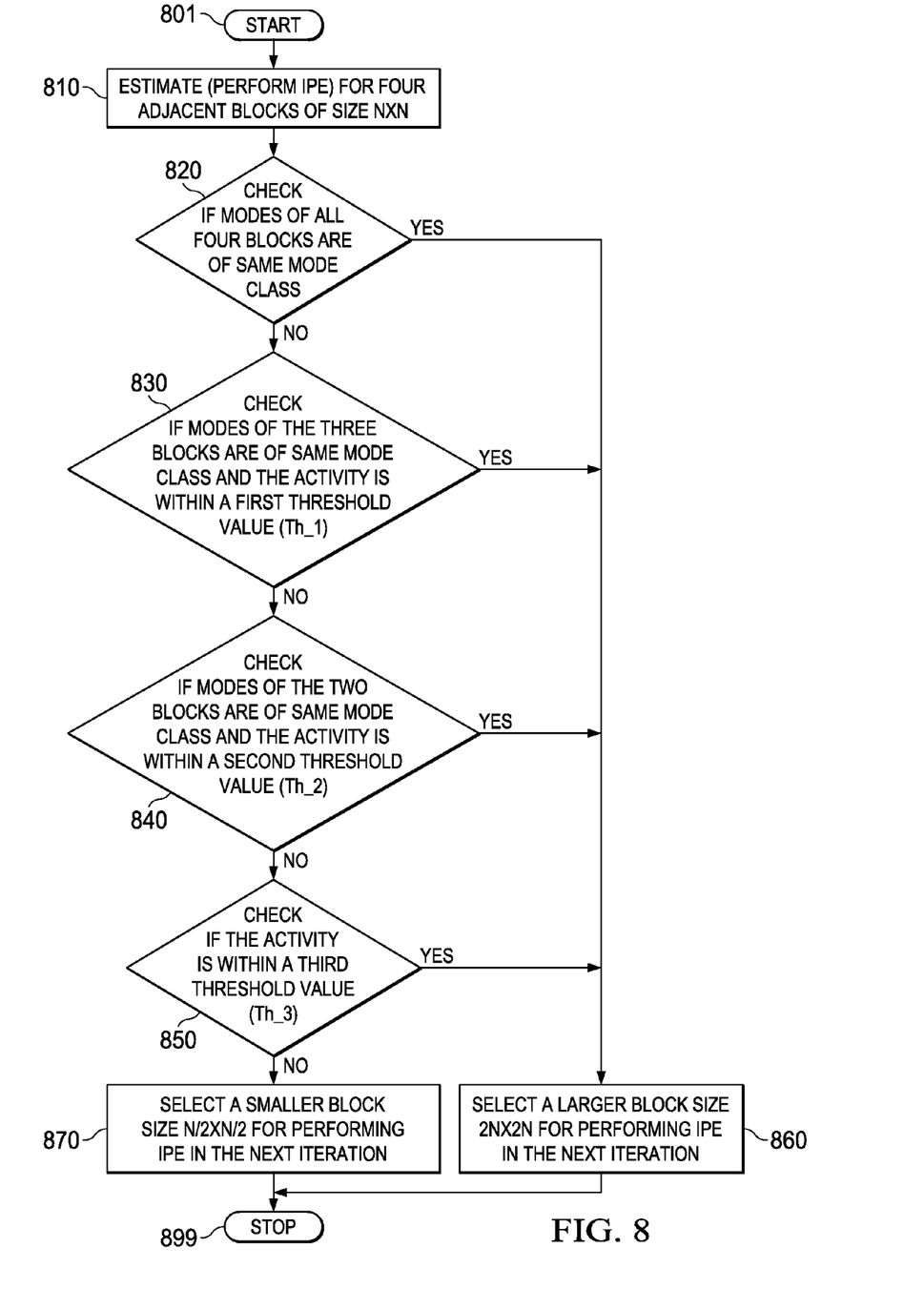
FIG. 8 is a flowchart illustrating the manner in which the intra-prediction block may use both the activity and mode class for combining the intermediate blocks, according to one embodiment.

FIG. 8 is a flowchart illustrating the manner in which the intra-prediction block may use both the activity and mode class for combining the intermediate blocks, according to one embodiment. The flow chart begins at Block 801, whereupon control passes to Block 810.

At Block 810, the intra-prediction block 380 may estimate (perform IPE) for four adjacent blocks of size N×N. The estimation may be performed for modes in accordance with FIG. 7 and a best mode for each N×N block may be determined.

In Block 820, the intra-prediction block 380 may check whether modes of all four blocks are of same mode class. If the result of the check is true, control passes to Block 860 and control passes to Block 830 otherwise. The best mode determined in Block 810 may be compared and if all modes are within a predetermined threshold angle, then the modes of the four N×N blocks may be considered as being of the same mode class.

In one alternate implementation, the intra-prediction block 380 may additionally determine the distortion of the block. For example, luma SATD (sum of absolute transform difference) or SAD (sum of absolute difference) of the N×N blocks may represent the distortion of the block. Alternatively, the intra-prediction block 380 may use any other parameters representing the distortion of the block. The SATD and/or SAD of a block may be computed using any known technique. The computed distortion for example, SATD and/or SAD, may be used as additional parameters for making the decision. For example, the intra-prediction block 380 may check whether the maximum luma SATD is less than K*Minimum luma SATD, in which K a threshold value that may be statically set or dynamically adjusted. If the result of the check is true, control passes to Block 860 and control passes to 830 otherwise. Due to the additional conditions, decision for the boundary blocks may be made more accurately.

In Block 830, intra-prediction block 380 checks if modes of the three adjacent, neighbouring blocks are of same mode class and the activity is within a first threshold value (Th_1). If the result of the check is true, control passes to Block 860 and control passes to 840 otherwise. The activity of the block may be computed as described with reference to equation 1, 2 and 3. The activity may be averaged over 2N blocks for measuring the smoothness of the blocks across the 2N block size.

In Block 840, intra-prediction block 380 checks if modes of the two blocks are of same mode class and the activity is within a second threshold value (Th_2). If the result of the check is true, control passes to Block 860 and control passes to Block 850 otherwise.

In Block 850, the intra-prediction block 380 checks if the activity is within a third threshold value (Th_3). If the result of the check is true, control passes to Block 860 and control passes to Block 870 otherwise. The first, second and third activity threshold values are tunable and may be dynamically adjusted. The threshold values may be adjusted such that the first threshold value is greater than the second threshold value and such that the second threshold value is greater than the third threshold value (Th_1>Th_2>Th_3), for example.

In Block 860, the intra-prediction block 380 selects a larger block size of 2N×2N for performing IPE in the next iteration. The intra-prediction block 380 may determine that the four N×N blocks are combinable. Therefore, the intra-prediction block 380 may select 2N×2N blocks formed by four N×N block considered in Block 810 for the next iteration, thereby moving in the upward direction in selecting the block size.

In Block 870, the intra-prediction block 380 may select a smaller block size N/2×N/2 for performing IPE in the next iteration. The intra-prediction block 380 may determine that the four N×N blocks are not combinable and, therefore, may select four N/2×N/2 blocks (within N×N block considered in Block 810) for the next iteration. Thereby moving in the downward direction in selecting the block size.

The manner in which the block size may be selected in the second iteration after Block 860 or 870 in FIG. 8 is described in further detail below.

Figure 9:
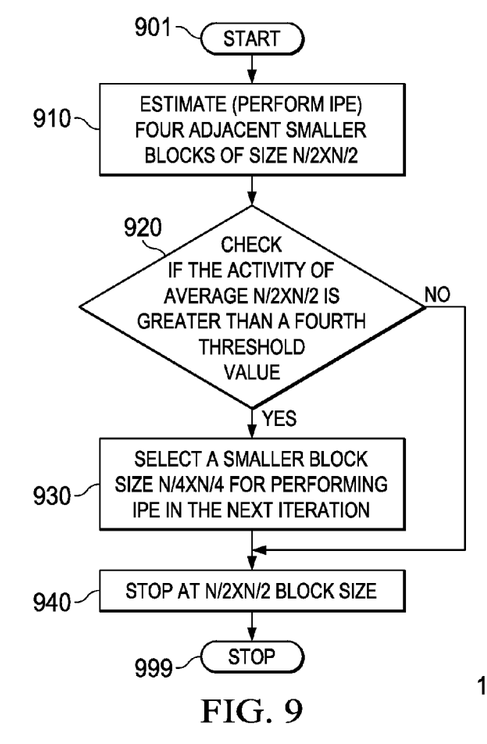
FIG. 9 is flowchart illustrating the selection of block size when the prior decision is in favour of smaller block size, according to one embodiment.

FIG. 9 is flowchart illustration the selection of block size when the prior decision according to FIG. 8 is in favour of selecting a smaller block size (Block 870), according to one embodiment. The flow chart begins at Block 901, whereupon control passes to Block 910.

At Block 910, the intra-prediction block 380 may estimate (perform IPE) for four adjacent smaller blocks of size N/2× N/2. For example, in case of HEVC standard, the intra-prediction block 380 may select four blocks of blocks size 8×8 within the 16×16 block.

At Block 920, the intra-prediction block 380 may check if the activity of average N/2×N/2 is greater than a fourth threshold value (Th_4). If the result of the check is true, control passes to Block 930 and control passes to Block 940 otherwise. The activity of the four 8×8 block may be determined in accordance with equations 1, 2, and 3. The fourth threshold value may be dynamically adjusted and may be set to a value that is greater than the first threshold value, such that Th_4>Th_1>Th_2>Th_3, for example.

At Block 930, the intra-prediction block 380 may select a smaller block size N/4×N/4 for performing IPE in the next iteration. The intra-prediction block 380 may determine that the four N/2×N/2 blocks are not combinable. Thus, the intra-prediction block 380 may select four N/4×N/4 blocks within each of the N/2×N/2 block considered in Block 910 in the next iteration, thereby moving in the further downward direction in selecting the block size.

In Block 940, the intra-prediction block 380 may stop at the N/2×N/2 block size. As a result, the intra-prediction block 380 may compare the cost of N/2×N/2 blocks and also the cost of the N×N blocks and select either N×N block or N/2× N/2 as the block size for generating a reference block. The flowchart ends at Block 999.

Figure 10:
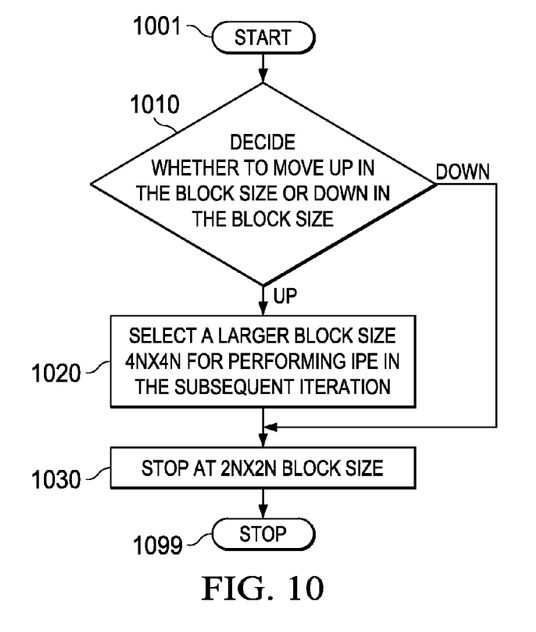
FIG. 10 is flowchart illustrating the selection of block size when the prior decision is in favour of larger block size, according to one embodiment.

FIG. 10 is a flowchart illustrating the selection of block size when the prior decision according to FIG. 8 is in favour of larger block size (Step 870), according to one embodiment. The flow chart begins at Block 1001, where upon control passes to Block 1010.

At Block 1010, the intra-prediction block 380 may decide whether to move up in the block size or down in the block size in accordance with FIG. 8. For example, the intra-prediction block 380 may execute the flowchart of FIG. 8 with a block size 2N×2N. If the decision is in favour of larger block size (4N×4N), control passes to Block 1020 and to Block 1030 otherwise. In Block 1020, the intra-prediction block 380 may select the larger block size 4N×4N for performing IPE in the subsequent iteration. At Block 1030, the intra-prediction block 380 stops at the 2N×2N block size. As a result, the intra-prediction block 380 may compare the cost of 2N×2N blocks and also the cost of the N×N blocks and select either N×N block or 2N×2N block for generating a reference block. The flowchart ends at Block 1099.

In one embodiment, the intra-prediction block 380 may employ the techniques described above and adaptively move up or down the quad tree structure (FIG. 4) in the HEVC standard to determine the best block size for encoding. Similarly, the intra-prediction block 380 may perform IPE by adaptively selecting the modes in accordance with FIG. 8. As a further alternative, the prediction block 380 may adaptively employ block selection techniques as described with reference to FIGS. 6, 8, 9 and 10 and may compute IPE for all the modes for each selected block. As a still further alternative, the intra-prediction block 380 may be configured to perform mode selection in accordance with FIG. 7 for all the block sizes. As a further alternative, the intra-prediction block 380 may be further configured to select block sizes in accordance with the description of FIGS. 6, 8, 9 and 10, and mode selection in accordance with the description of FIG. 7.

While various examples of the present disclosure have been described above, it should be understood that they have been presented by way of example, and not limitation. Thus, the breadth and scope of the present disclosure should not be limited by any of the above-described examples, but should be defined in accordance with the following claims and their equivalents.

What is claimed is:

1. A method comprising:
   selecting an intermediate size from a set of block sizes for encoding a video signal;
   performing an intra-prediction estimation search for each block in a set of neighbouring blocks of the selected intermediate size to determine a plurality of best modes for the neighbouring blocks, each of best modes corresponding to a respective one of the neighbouring blocks;
   determining whether the neighbouring blocks of the selected intermediate size are combinable based on the best modes for the neighbouring blocks;
   when the neighbouring blocks are determined to be combinable, performing an intra-prediction estimation search for a first block of a first size that is larger than the selected intermediate size; and
   when the neighbouring blocks are determined to not be combinable, performing an intra-prediction estimation search for a second block of a second size that is smaller than the selected intermediate size.

2. The method of claim 1, wherein the first block is formed by combining the set of neighbouring blocks and the second block is formed by dividing the set of neighbouring blocks.

3. The method of claim 2, wherein the intermediate size, first size, and second size are tree-block sizes in the quad-tree segmentation specified in the High Efficiency Video Coding (HEVC) standard.

4. The method of claim 3, further comprising:
determining that the neighbouring blocks are combinable if the best modes for the neighbouring blocks are of a same class.

5. The method of claim 4, further comprising determining that neighbouring blocks are combinable if a distortion of the set of neighbouring blocks is above a second threshold.

6. The method of claim 4, further comprising:
performing an intra-prediction estimation search based on a first subset of modes within a full set of modes specified for intra-prediction, wherein performing the intra-prediction estimation search includes:
intra-predicting a third block based on a first mode in the first subset of modes, wherein a cost associated with predicting the third block with the first mode is lower than predicting the third block with other modes in the first subset of modes;
intra-predicting the third block with a second subset of modes within a first angle from the first mode; and
selecting a mode with a lowest cost from the first mode and modes in the second subset as a prediction mode for the third block, wherein a number of modes in the first subset of modes is less than a number of modes in the full set of modes.

7. The method of claim 6, further comprising:
determining whether neighbouring blocks of the first size are combinable;
selecting a fourth block of a third size greater than the first size if the neighbouring blocks of the first size are determined to be combinable; and
predicting a block with an intermediate size encoding if the neighbouring blocks of the first size are determined to not be combinable.

8. The method of claim 7, wherein the full set of prediction mode are prediction modes of the High Efficiency Video Coding (HEVC) standard and wherein the first angle is 11.25 degrees.

9. The method of claim 3, further comprising determining that the neighbouring blocks are not combinable if an activity of at least one of the neighbouring blocks is greater than a first threshold.

10. The method of claim 9, wherein the activity is determined from:

$$act(n) = \frac{(actX(n) + actY(n))}{f(V, H)}$$

wherein $$actX(n) = \sum_{y=0}^{V-1} \sum_{x=0}^{H-2} |curr_{(n)}(x, y) - curr_{(n)}(x+1, y)|$$

and $$actY(n) = \sum_{x=0}^{H-1} \sum_{y=0}^{V-2} |curr_{(n)}(x, y) - curr_{(n)}(x, y+1)|$$

wherein V is the number of pixels in a vertical direction, H is the number of pixels in a horizontal direction, and n is the number of current pixels.

11. A video codec comprising:
one or more processors configured to:
select an intermediate size from a set of block sizes for encoding a video signal;
perform an intra-prediction estimation search for each block in a set of neighbouring blocks of the selected intermediate size to determine a plurality of best modes for the neighbouring blocks, each of best modes corresponding to a respective one of the neighbouring blocks;
determine whether the neighbouring blocks of intermediate size are combinable based on the best modes for the neighbouring blocks;
perform an intra-prediction estimation search for a first block of a first size that is larger than the intermediate size if the neighbouring blocks are combinable and
perform an intra-prediction estimation search for a second block of a second size that is smaller than the intermediate size if the neighbouring blocks are not combinable.

12. The video codec of claim 11, wherein the first block is formed by combining the set of neighbouring blocks and the second block is formed by dividing the set of neighbouring blocks.

13. The video codec of claim 12, wherein the intermediate size, first size, and second size are tree-block sizes in the quad-tree segmentation specified in the High Efficiency Video Coding (HEVC) standard.

14. The video codec of claim 13,
wherein the one or more processors are further configured to determine that the neighbouring blocks are combinable if the best modes for the neighbouring blocks are of a same class.

15. The video codec of claim 14, wherein the one or more processors are further configured to determine that the of neighbouring blocks are not combinable if an activity of at least one of the neighbouring blocks is greater than a first threshold.

16. The video codec of claim 15, wherein the activity is determined from:

$$act(n) = \frac{(actX(n) + actY(n))}{f(V, H)}$$

wherein $$actX(n) = \sum_{y=0}^{V-1} \sum_{x=0}^{H-2} |curr_{(n)}(x, y) - curr_{(n)}(x+1, y)|$$

and $$actY(n) = \sum_{x=0}^{H-1} \sum_{y=0}^{V-2} |curr_{(n)}(x, y) - curr_{(n)}(x, y+1)|$$

wherein V is the number of pixels in a vertical direction, H is the number of pixels in a horizontal direction, and n is the number of current pixels.

17. The video codec of claim 16, wherein the one or more processors are further configured to:
perform an intra-prediction estimation search based on a first set of modes within a full set of prediction modes; and
intra-predict the third block with a second set of modes within a first angle of at least one mode in the first set of modes,
wherein a number of modes in the first set of modes is less than number of modes in the full set of prediction modes.

18. The video codec of claim 16, wherein the full set of prediction modes are prediction modes of the High Efficiency Video Coding (HEVC) standard and the first angle is 11.5 degrees.

* * * * *